United States Patent [19]

Larkin

[11] Patent Number: 5,363,881
[45] Date of Patent: Nov. 15, 1994

[54] PLUMBING TOOL FOR TEMPORARILY PLUGGING A PIPE WITH FIELD-REPLACEABLE GASKET

[76] Inventor: Brent H. Larkin, 6749 W. Quinella Dr., Las Vegas, Nev. 89103

[21] Appl. No.: 126,405
[22] Filed: Sep. 27, 1993
[51] Int. Cl.⁵ ............................................. F16L 55/10
[52] U.S. Cl. .......................................... 138/89; 138/90
[58] Field of Search ............... 138/89, 90; 220/233, 220/235; 4/295

[56] References Cited

U.S. PATENT DOCUMENTS

| | | | |
|---|---|---|---|
| 491,184 | 2/1893 | McCartney | 138/89 |
| 1,055,124 | 3/1913 | Bills | 138/89 |
| 1,850,040 | 3/1932 | Turner | 138/89 |
| 1,997,878 | 4/1935 | Wagner | 138/89 |
| 2,245,887 | 6/1941 | Wikander | 138/89 |
| 2,514,911 | 7/1950 | Tatum | 138/89 |
| 2,725,112 | 11/1955 | Weismon et al. | 138/89 |
| 2,764,184 | 9/1956 | Fitzhugh et al. | 138/89 |
| 2,977,992 | 4/1961 | Jensen | 138/89 |
| 3,993,103 | 11/1976 | Hammer | 138/89 |
| 4,310,029 | 1/1982 | Dudek | 138/89 |

FOREIGN PATENT DOCUMENTS 320693  5/1953  Switzerland .......................... 138/89

OTHER PUBLICATIONS

"Removable Plugs Seal Pipe Ends", Product Engineering, Jan. 6, 1964.

*Primary Examiner*—James E. Bryant, III
*Attorney, Agent, or Firm*—William H. Drummond

[57] ABSTRACT

A plumbing tool for temporarily plugging a pipe which normally contains fluid under pressure. An elongate threaded rod has proximal and distal ends. A hollow elongate sleeve is disposed around the threaded rod. A cylindrical gasket is disposed around the rod between the hollow sleeve and a gasket stop on the distal end of the rod. The stop includes a washer, keyed to the threaded rod to prevent relative rotational motion, and a nut engaged on the distal end of the threaded rod, to permit field removal of the washer and field replacement of the gasket.

1 Claim, 1 Drawing Sheet

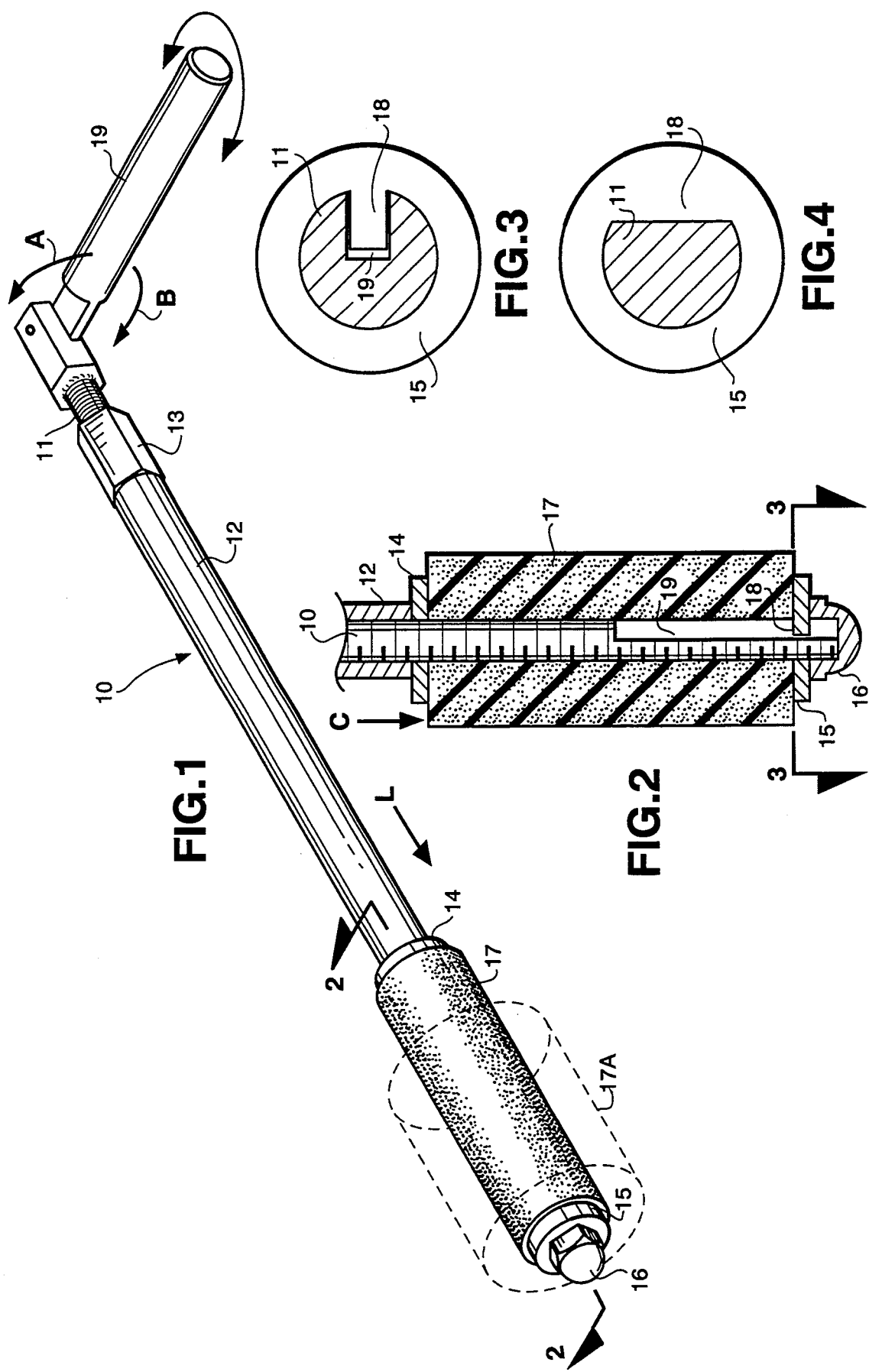

PLUMBING TOOL FOR TEMPORARILY PLUGGING A PIPE WITH FIELD-REPLACEABLE GASKET

This invention relates to a plumbing tool.

More particularly, the invention concerns improvements in plumbing tools of the type used for temporarily plugging water pipes and the like which normally contain fluid under pressure. In a more particular respect, the invention concerns improvements in plumbing tools of the type which utilize a radially expandable cylindrical gasket, carried at the end of an elongate rod.

Even more particularly, the invention relates to such a plumbing tool which is specially adapted to permit convenient field replacement of the radially expandable gasket.

The prior art includes numerous examples of plumbing tools of the general type which involve a radially expandable cylindrical rubber gasket carried on the distal end of an elongate rod, which can be inserted through a gate valve into the interior of a water pipe, gas pipe or the like. After insertion within the pipe, axial force is applied to the cylindrical gasket, causing it to expand radially to temporarily plug the interior bore of the pipe. Such tools are disclosed, for example, in the U.S. Pat. No. 2,108,068 to Larry and in U.S. Pat. No. 2,322,842 to French.

As disclosed by the Larry and French patents, such tools typically exert axial pressure on the cylindrical gasket by rotation of a threaded elongate rod relative to an internally threaded bushing. Such relative rotation of the bushing, in turn, exerts axial force toward the distal end of the rod on an intermediate cylindrical sleeve disposed around the rod. The distal end of the sleeve, in turn, applies axial force in the distal direction which causes compression of the gasket member and, consequently, radially expands the gasket member to plug the bore of the pipe.

In the operation of such devices, rotational torque is also transmitted to the cylindrical gasket and this torque is applied to whatever element forms a distal stop member which limits longitudinal movement of the gasket and forces it to radially expand. If the distal stop for the gasket is merely a nut or a conventional nut and washer, threadedly engaged with the distal end of the elongate rod, as in the French and Larry patents, the torsional force applied to the nut or to the nut-washer combination by the gasket member, ultimately causes the nut to rotate off the end of the gasket rod and the tool can be accidentally disassembled during use.

Various means have been proposed to prevent such accidental disassembly of the tool. For example, in U.S. Pat. No. 4,111,978 to Chisholm, the stop member is formed integrally with the rod. In Thomas, U.S. Pat. No. 2,177,916, the stop member is affixed to an extension of the threaded rod by brazing the stop member to the extension. In the U.S. Pat. No. 1,181,984 to Arni, the nut which restrains axial movement of a distal washer is semi-permanently fixed to the threaded shaft by a pin extending through the nut and the shaft.

In an attempt to prevent such accidental disassembly of the tool, it has also been proposed to use a "lock nut" (U.S. Pat. No. 3,022,801 to Petersen) or to use a "lock washer" (U.S. Pat. No. 4,557,285 to Baron). Experience has shown, however, that the use of conventional lock washers or lock nuts still does not completely prevent accidental disassembly of the tool, because the torsional forces ultimately defeat such expidents.

Furthermore, permanently affixing the stop member to the end of the threaded shaft as in the Thomas patent (brazing) and the Chisholm patent (integral formation with the shaft), as well as semi-permanently fixing the a nut to the threaded rod by a pin (Arni), either completely prevents replacement of the cylindrical gasket or prevents replacement in the field. This significantly reduces the utility of the tool, since it is frequently necessary to replace the cylindrical gasket because of wear or to change between gaskets having different radial dimensions, to accommodate plugging pipes having different inside diameters. If such field replacement of the cylindrical gasket cannot be readily done, then it is necessary to carry a number of replacement tools or an array of tools with different gasket diameters, rather than merely carrying a single tool with appropriate substitute gaskets.

Accordingly, it would be highly desirable to provide a plumbing tool of the general type described above, which is adapted to resist accidental disassembly of the tool by torsional forces applied to the distal nut, but which is easily disassembled by unskilled workers, using only conventional hand tools, such that the replacement of the cylindrical gasket can be quickly and conveniently performed in the field.

It is therefore the principle object of the present invention to provide an improved plumbing tool.

Yet another object of the invention is to provide an improved plumbing tool of the type described above which is specially adapted to prevent accidental disassembly during use, but can be easily intentionally disassembled for field replacement of the cylindrical gasket.

These and other, further and more specific objects and advantages of the invention, will be apparent to those skilled in the art from the following detailed description thereof, taken in conjunction with the drawings in which:

FIG. 1 is a perspective view of an improved plumbing tool constructed in accordance with the presently preferred embodiment of the invention;

FIG. 2 is a sectional view of the distal end of the plumbing tool of FIG. 1, taken along section line 2—2 thereof;

FIG. 3 is a cross-sectional view of the plumbing tool of

FIG. 2, taken along section line 3—3 thereof; and

FIG. 4 is an alternate embodiment showing a presently preferred embodiment of the invention.

Briefly, in accordance with the invention, I provide an elongate threaded rod having a proximal end and a distal end. A hollow elongate sleeve is coaxially disposed around and slidable upon the threaded rod, intermediate the proximal and distal ends thereof. A first nut is threadedly engaged on the rod proximal the elongate sleeve. A gasket stop is provided on the rod distal of the slidable sleeve. A cylindrical gasket is disposed coaxially around the rod between the sleeve and the stop means. The cylindrical gasket expands radially when it is longitudinally compressed. Means are provided for advancing the first nut on the rod toward the distal end to compress the gasket member between the hollow sleeve and the gasket stop. According to the invention, this type of plumbing tool is improved by providing a gasket stop comprising a washer keyed to the distal end of the threaded rod for axial movement therewith and a second nut threadedly engaged with but freely rotatable with respect to the threaded rod, located distally of the keyed washer.

Turning now to the drawings in which like reference characters identify the same element in the several views, the plumbing tool, generally indicated by reference character 10, includes an elongate rod 11 which is threaded, and a hollow elongate sleeve 12, coaxially disposed around and slidable upon the rod 10. A first nut 13 is threadedly engaged with the elongate threaded rod 11 proximal of the sleeve 12, which bears upon a washer 14 which is also slidable along the threaded rod 11. A gasket stop is provided by a keyed washer 15 and a cap nut 16 threadedly engaged with the threaded rod 10. The cylindrical gasket 17 is disposed around the threaded rod 10 between the distal end of the sleeve 12 and the stop 15-16.

As illustrated FIGS. 3 and 4, the washer 15 is keyed to the shaft 10 by means of a radially inwardly projecting portion 18 formed in the inner circumference of the washer 15. The inner projection 18 registers with a keyway 19 formed in the distal end of the threaded rod 11, to prevent relative rotational motion between the washer 15 and the rod 11. The threaded shaft 11 is welded or brazed to the handle 20.

In operation, the device of FIG. 1 function as follows. Relative rotational movement between the shaft 11 and the first nut 13, which can be produced by holding the nut 13 stationary, for example, with a small wrench and rotating the handle 19 in the direction of the arrows A and B. When the nut 13 is advanced toward the distal end of the rod 11, it bears on the sleeve 12 and transmits compressive force through the washer 14 against the proximal end of the cylindrical gasket 17, in the direction of the arrow C. Since the distal end of the cylindrical gasket 17 is restrained by the stop 15-16, the gasket 17 expands radially, for example, as indicated by the dash lines 17a. Any torsional force exerted by rotation of the nut 13 with respect to the rod 11, which is transmitted to the cylindrical gasket 17 via the sleeve 12 and washer 14, is resisted by the keyed washer 15 and is not transmitted to the nut 16 to induce unintended disassembly of the tool. On the other hand, nut 16 is easily rotated off the end of the threaded rod 10, without special tools, to permit rapid and convenient disassembly of the tool for replacement of the cylindrical gasket 17 in the field.

Having described by invention in such terms as to enable those skilled in the art to make and use it, and having identified the presently preferred embodiment thereof, I claim:

1. In a plumbing tool for temporarily plugging a pipe which normally contains a fluid under pressure, said tool including
   an elongate threaded rod having proximal and distal ends,
   a hollow elongate sleeve, coaxially disposed around said elongate threaded rod, intermediate said proximal and distal ends,
   a first nut threadedly engaged on said elongate threaded rod, proximal of said hollow elongate sleeve,
   gasket stop on said rod, distal of said hollow elongate sleeve, and
   a cylindrical gasket coaxially disposed around said elongate threaded rod between said hollow elongate sleeve and said stop which expands radially when longitudinally compressed,
the improvement in said plumbing tool in which said gasket stop comprises:
   (a) a washer, keyed to said elongate threaded rod, to prevent relative rotational motion of said washer and said elongate threaded rod, located on said threaded rod distal of said gasket; and
   (b) a second nut threadedly engaged on said threaded rod distal of said washer for free relative rotational movement between said second nut and said threaded rod, to permit field removal of said washer and said second nut from said threaded rod for replacement of said cylindrical gasket.

* * * * *